United States Patent [19]
Vukovich et al.

[11] Patent Number: 5,685,799
[45] Date of Patent: Nov. 11, 1997

[54] AUTOMATIC TRANSMISSION SHIFT STABILIZATION CONTROL

[75] Inventors: William Joseph Vukovich, Ypsilanti; Melissa Mei Koenig, Ann Arbor, both of Mich.

[73] Assignee: General Motors Corporation, Detroit, Mich.

[21] Appl. No.: 673,132

[22] Filed: Jul. 1, 1996

[51] Int. Cl.[6] .................................................. F16H 61/48
[52] U.S. Cl. ............................ 477/61; 477/148; 477/154
[58] Field of Search ............................. 477/61, 53, 128, 477/129, 154, 143, 144, 148, 149

[56] References Cited

U.S. PATENT DOCUMENTS

| | | | |
|---|---|---|---|
| 5,038,636 | 8/1991 | Vukovich et al. | 477/148 |
| 5,046,383 | 9/1991 | Butts et al. | 477/154 X |
| 5,050,458 | 9/1991 | Vukovich et al. | 477/154 |
| 5,172,609 | 12/1992 | Nitz et al. | 477/129 X |
| 5,211,079 | 5/1993 | Runde et al. | 477/61 |
| 5,434,779 | 7/1995 | Vukovich et al. | 477/129 X |
| 5,577,980 | 11/1996 | Vukovich et al. | 477/148 X |

Primary Examiner—Charles A. Marmor
Assistant Examiner—Peter T. Kwon
Attorney, Agent, or Firm—Vincent A. Cichosz

[57] ABSTRACT

A control for an automatic transmission minimizes shift cycling between adjacent speed ratios due to non-ideal load conditions such as grade climbing and trailering. The control utilizes shift schedule data in formulating a determination of the ability of the vehicle to maintain current levels of performance if an upshift were to occur and inhibits such upshifts where the determination so indicates an inability to meet the criteria.

17 Claims, 7 Drawing Sheets

| GEAR | RATIO | C1 | C2 | C3 | C4 | C5 | OC | RC |
|---|---|---|---|---|---|---|---|---|
| 1st | 3.61 | ON | OFF | OFF | ON | OFF | ON | OFF |
| 2nd | 1.85 | ON | ON | OFF | ON | OFF | ON | OFF |
| 3rd | 1.37 | ON | ON | OFF | ON | ON | OFF | OFF |
| 4th | 1.00 | ON | ON | ON | OFF | OFF | ON | OFF |
| 5th | 0.74 | ON | ON | ON | OFF | ON | OFF | OFF |
| P/N | — | OFF | OFF | OFF | OFF | OFF | OFF | OFF |
| R | -2.06 | OFF | OFF | ON | OFF | OFF | ON | ON |

FIG. 1C

| SOLENOID STATES ||||
|---|---|---|---|
| GEAR | SOLENOID A | SOLENOID B | SOLENOID C |
| 1st | ON | OFF | ON |
| 2nd | OFF | OFF | ON |
| 3rd | OFF | ON | ON |
| 4th | OFF | OFF | OFF |
| 5th | OFF | ON | OFF |

FIG. 1D

AUTOMATIC TRANSMISSION SHIFT STABILIZATION CONTROL

BACKGROUND

The present invention is related generally to the art of automatic transmission shift control. More specifically, the invention is concerned with the minimization or elimination of undesirable shift busyness.

Common practice in the transmission control art is to provide shift schedules which are used to determine shift points in accordance with calibrated relationships between certain powertrain parameters. Most commonly, such shift schedules relate a transmission output speed quantity to an engine load indicator. For example, vehicle speed may be correlated to throttle position to establish a desired shift schedule. Upshifting from one speed ratio to a lower speed ratio is conventionally done in accordance with measuring the vehicle speed and throttle position, referencing a shift specific set of data with one of the vehicle speed and throttle position, returning a threshold value of the other of vehicle speed and throttle position, and performing a comparison of the corresponding one of the measured vehicle speed and throttle position to determine the propriety of performing an upshift. A downshift is similarly performed. Shifting between a pair of numerically adjacent speed ratios occurs with a degree of hysteresis to add stability to this function. Such shift schedules are generally calibrated for normal or optimal conditions such as sea level barometer, flat pavement, and no additional cargo or tow load. Non-optimal conditions result in various shift anomalies including a condition of shift busyness where upshifts are followed by downshifts due to loss in vehicle speed post-shift or operator throttle position compensation in an attempt to achieve the pre-shift level of performance or feel.

Transmission controls are known which attempt to reduce the effects of such non-optimal operating conditions. One such technique disclosed in U.S. Pat. No. 5,172,609, assigned to Saturn Corporation, relies on iterative calculations of a grade load term in a current speed ratio and an excess gradeability term for a lower speed ratio. The grade calculation is a complex term including absolute values of calculated engine torque, wheel torque, and vehicle acceleration. The gradeability term is obtained from a set of calibration values corresponding to optimal conditions. The gradeability term is then compensated for barometric pressure and torque converter turbine speed, the latter of which artificially increases the gradeability at high engine speeds to address undesirable high speed engine operation at closed throttle conditions.

SUMMARY

It is an object of the present invention to minimize cycling between adjacent speed ratios.

It is another object of the present invention to determine if the vehicle is operating against an excessive load and compensate shift control accordingly.

Yet another object of the present invention is to account for operating points of the torque converter in such compensations.

It is yet another object of the present invention to eliminate the error introduced into the shift stability method by iterative calculations to arrive at absolute values of powertrain parameters.

Additionally, it is desirable that these objects be carried out in a manner requiring minimal software overhead both in terms of calibration tables and processor throughput, and requiring minimal compensation for non-optimal operating conditions.

These and other objects and features of the present invention are accomplished by preventing shift cycling between numerically adjacent speed ratios in a motor vehicle powertrain. The powertrain includes an engine, torque converter, and a multi-ratio automatic transmission. The transmission has a plurality of speed ratios which are selectively engaged in accordance with a shift schedule comprising predetermined relationships between throttle position and powertrain output speed. The present control monitors powertrain output speed and throttle position and detects therefrom a relationship between the monitored parameters indicative of incipient upshift. A minimum post-shift output torque requirement preferably related to the current torque is provided as is a maximum post-shift output torque substantially equivalent to the output torque sustainable at preferably the current powertrain output speed before a downshift condition would be detected assuming the second one of the plurality of speed ratios was engaged. Finally, comparison is made between the maximum post-shift output torque and the minimum post-shift output torque requirement, a torque deficit resulting in the inhibition of the scheduling of the upshift.

BRIEF DESCRIPTION OF THE DRAWINGS

The present invention will now be described, by way of example, with reference to the accompanying drawings, in which:

FIG. 1c is a state diagram for the clutches of the transmission illustrated in FIGS. 1a–1b;

FIG. 1d is a chart showing the various control solenoid states required for operating the transmission in and between the various speed ratios;

DETAILED DESCRIPTION OF THE INVENTION

Figure 1A:
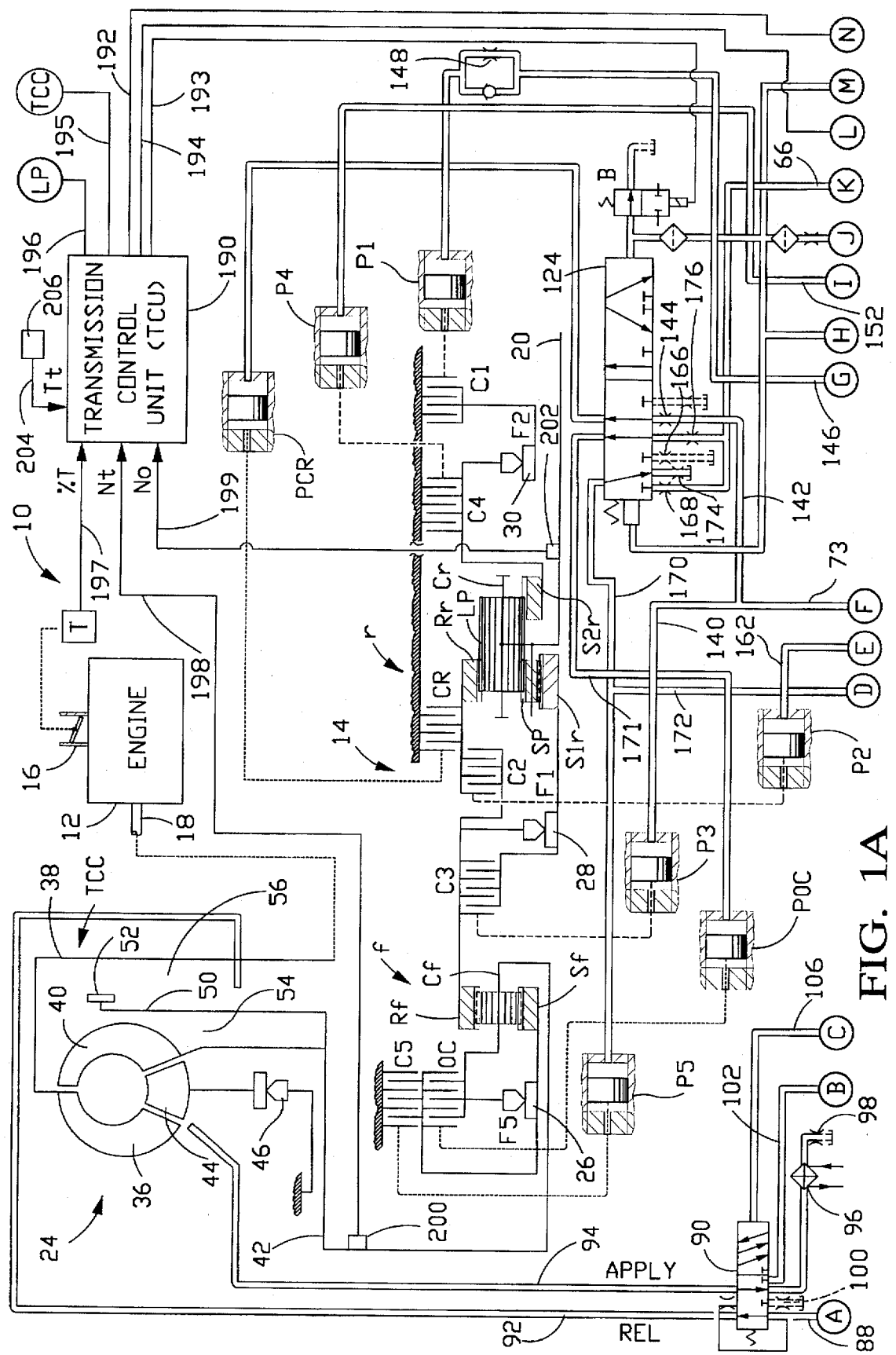
FIGS. 1a–1b is a schematic figure of a multi-ratio automatic transmission controlled in accordance with the present shift stabilization invention by way of a computer-based controller.
Figure 1B:
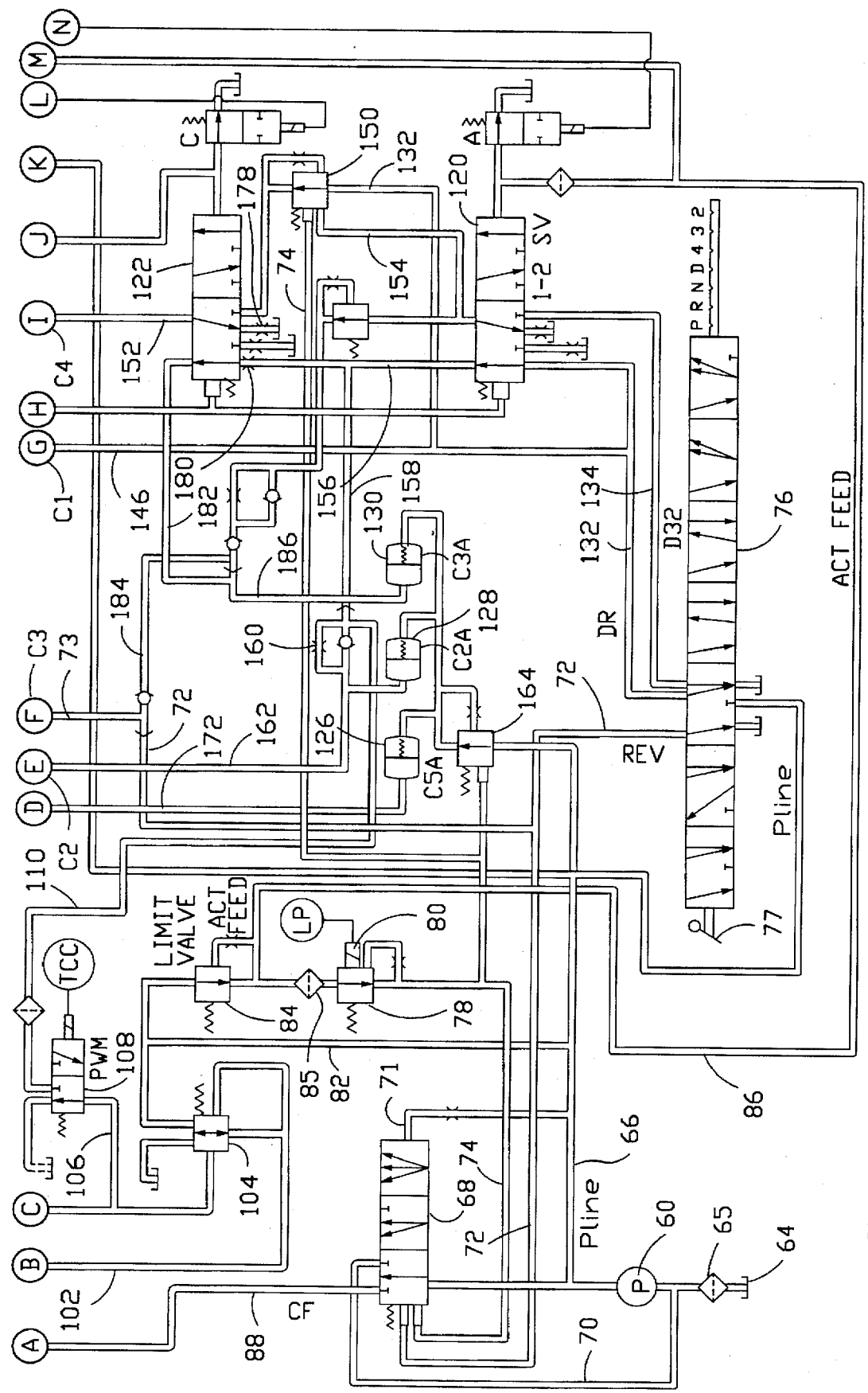

Referring now to FIGS. 1a–1b of the drawings, the control of the present invention is described in reference to a motor vehicle drivetrain 10 including an engine 12 and a planetary transmission 14 having a reverse speed ratio and five forward speed ratios. Engine 12 includes a throttle mechanism 16 mechanically connected to an operator manipulated device, such as an accelerator pedal (not shown), for regulating the air intake of the engine. The engine 12 is fueled by a conventional method in relation to the air intake to produce output torque in proportion thereto. Such torque is applied to the transmission 14 through the engine output shaft 18.

The transmission 14, in turn, transmits engine output torque to an output shaft 20 through a torque converter 24 and one or more of the fluid operated clutches C1–C5, OC, Reverse clutch RC, and one-way clutches 26–30, such clutches being applied or released according to a predetermined schedule for establishing a desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the turbine shaft 42. A stator member 44 redirects the fluid which couples the impeller 36 to the turbine 40, the stator being connected through a one-way device 46 to the housing of transmission 14.

The torque converter 24 also includes a clutch TCC comprising a clutch plate 50 secured to the turbine shaft 42. The clutch plate 50 has a friction surface 52 formed thereon adaptable to be engaged with the inner surface of the input shell 38 to form a direct mechanical drive between the engine output shaft 18 and the turbine shaft 42. The clutch plate 50 divide the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38, thereby engaging the TCC to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 as shown in FIG. 1a, thereby uncoupling such mechanical drive connection and permitting slippage between the impeller 36 and the turbine 40. The turbine shaft 42 is connected as an input to the carrier Cf of a forward planetary gearset f. The sun Sf is connected to carrier Cf via the parallel combination of one-way clutch F5 and friction clutch OC. The clutch C5 is selectively engageable to ground the sun Sf. The ring Rf is connected as an input to the sun S1r of a compound rearward planetary gearset r via the parallel combination of one-way clutch F1 and friction clutch C3. The clutch C2 selectively connects the forward gearset ring Rf to rearward gearset ring Rr, and the Reverse clutch CR selectively grounds the ring Rr. The sun S2r is selectively grounded by clutch C4 or by clutch C1 through the one-way clutch F2. The long pinion LP mechanically couples sun gears S1r and S2r through short pinion SP, and the carrier Cr is connected as an output to shaft 20.

Figure 2:
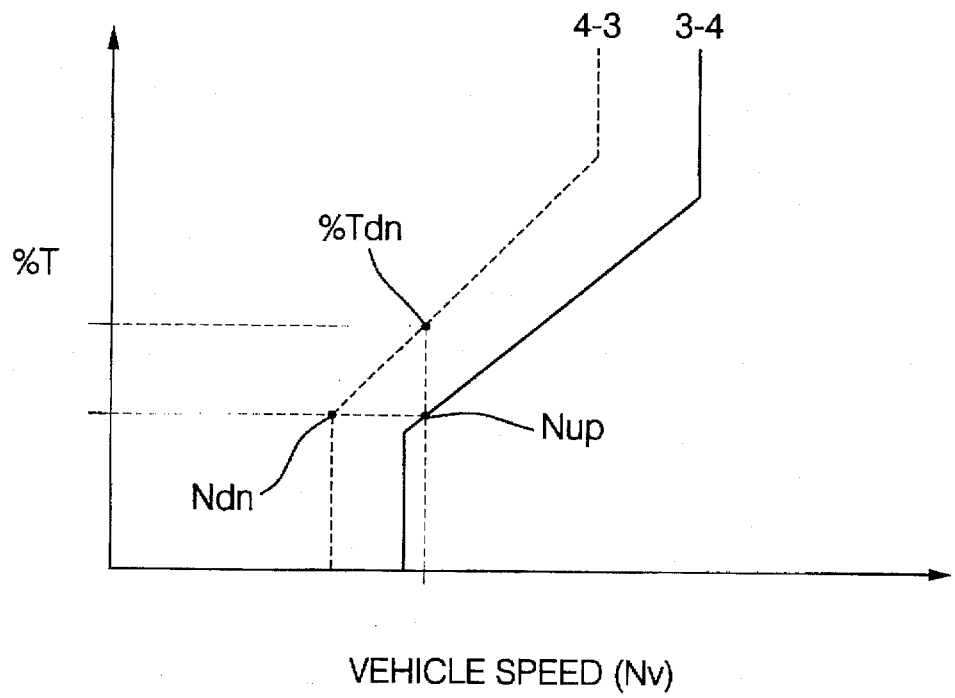
FIG. 2 graphically depicts a conventional shift pattern for scheduling 3-4 upshifts and 4-3 downshifts.

The various speed ratios and the clutch states required to establish them are set forth in the chart of FIG. 2. Referring to that Figure, it is seen that the Park/Neutral condition is established by releasing all of the clutches. A garage shift to Reverse is effected by engaging the C3, OC and RC clutches. In the forward speed ranges, a garage shift to 1st is effected by engaging the clutches C1, C4 and OC. In this case, the forward gearset f is locked up and the one-way clutch F1 applies the turbine speed Nt as an input to the sun element Sr of rearward gearset r, providing a Ni/No ratio of 3.61.

As the vehicle speed increases, an upshift from 1st to 2nd is effected simply by engaging clutch C2; the one-way clutch F1 overruns as soon as on-coming clutch C2 develops sufficient torque capacity. The forward gearset f remains locked up, and the clutch C2 applies the turbine speed Nt as an input to the ring element Rr of rearward gearset r to provide a Ni/No ratio of 1.85. Downshifting from 2nd to 1st merely involves releasing clutch C2.

The upshift from 2nd to 3rd is effected by engaging clutch C5 and releasing clutch OC so that the forward gearset operates as an overdrive, thereby providing a Ni/No ratio of 1.37. Downshifting from 3rd to 2nd is effected by releasing clutch C5 and engaging clutch OC to return the forward gearset f to a lock-up condition.

The upshift from 3rd to 4th is effected by releasing clutch C5 and engaging clutch OC to return the forward gearset f to a lock-up condition, while releasing clutch C4 and engaging clutch C3 to lock-up the rearward gearset r, one-way clutch F2 releasing the rear planet axis Pr. In this case, the turbine speed Nt is transmitted directly to output shaft 20 for a Ni/No ratio of 1.00. The downshift 4th to 3rd is effected by releasing clutch OC and engaging clutch C5 to return the forward gearset f to an overdrive condition, while releasing clutch C3 and engaging clutch C4 to apply the turbine speed Nt as an input to the ring element Rr.

The timing of the 3-4 upshift and 4-3 downshift state changes must be properly coordinated to avoid conditions which would cause the ratio to change in the wrong direction or at the wrong rate. In the upshift, for example, care must be taken to ensure that on-coming clutch C3 is ready to lock-up the rearward gearset r when off-going clutch C5 is released to lock-up the forward gearset f. Otherwise, the Ni/No ratio initially increases from the 3rd ratio of 1.37 toward the 2nd ratio of 1.85. Conversely, in the 4-3 downshift, care must be taken to ensure that on-coming clutch C5 is ready to engage to e establish an overdrive condition in the forward gearset f when off-going clutch C3 is released. Otherwise, the Ni/No ratio increases toward the 2nd ratio of 1.85 instead of the 3rd ratio of 1.37.

Completing the shift analysis, the upshift from 4th to 5th is effected by engaging clutch C5 and releasing clutch OC to operate the forward gearset f in an underdrive condition, thereby providing a Ni/No ratio of 0.74. Downshifting from 4th to 3rd is effected by releasing clutch C5 and engaging clutch OC.

A positive displacement hydraulic pump 60 is mechanically driven by the engine output shaft 18. pump 60 receives hydraulic fluid at low pressure from the fluid reservoir 64 and filter 65, and supplies line pressure fluid to the transmission control elements via output line 66. A pressure regulator valve (PRV) 68 is connected to the pump output line 66 and serves to regulate the line pressure by returning a controlled portion of the line pressure to reservoir 64 via the line 70. The PRV 68 is biased at one end by orifice line pressure in line 71 and at the other end by the combination of a spring force, a Reverse ratio fluid pressure in line 72 and a controlled bias pressure in line 74.

The Reverse fluid pressure is supplied by a Manual Valve 76, described below. The controlled bias pressure is supplied by a Line Pressure Bias Valve 78 which develops pressure in relation to the current supplied to electric force motor 80. Line pressure is supplied as an input to valve 78 via line 82, a pressure limiting valve 84 and filter 85. The limited line pressure, referred to as ACT FEED pressure, is also supplied as an input to other electrically operated actuators of the control system via line 86. With the above-described valving arrangement, it will be seen that the line pressure of the transmission is electrically regulated by force motor 80.

In addition to regulating line pressure, the PRV 68 develops a regulated converter feed (CF) pressure for the torque converter 24 in line 88. The CF pressure is supplied as an input to TCC Control Valve 90, which in turn directs the CF pressure to the release chamber 56 of torque converter 24 via line 92 when open converter operation is desired. In this case, the return fluid from torque converter 24 is exhausted via line 94, the TCC Control Valve 90, an oil cooler 96 and an orifice 98. When closed converter operation is desired, the TCC Control Valve 90 exhausts the release chamber 56 of torque converter 24 to an orifice exhaust 100, and supplies a regulated TCC apply pressure in line 102 to the apply chamber 54, thereby engaging the TCC. The TCC apply pressure in line 102 is developed from line pressure by a TCC Regulator Valve 104.

Both the TCC Control Valve 90 and the TCC Regulator Valve 104 are spring biased to effect the open converter condition, and in each case, the spring force is opposed by an electrically developed control pressure in line 106. The control pressure in line 106 is developed by the solenoid operated TCC Bias Valve 108, through a ratiometric regulation of the fluid pressure in line 110. When closed converter operation is desired, the solenoid of TCC Bias Valve 108 is pulse-width modulated at a controlled duty cycle to ramp up the bias pressure in line 106. Bias pressures above the pressure required to shift the TCC Control Valve to the closed-converter state are used to control the TCC apply pressure developed in line 102 by TCC Regulator Valve 104. In this way, the TCC Bias Valve 108 is used to control the torque capacity of the TCC when closed converter operation is desired.

The friction clutches C1–C5, OC and CR are activated by conventional fluid operated pistons P1–P5, POC and PCR, respectively. The pistons in turn, are connected to a fluid supply system comprising the Manual Valve 76 referred to above, the Shift Valves 120, 122 and 124, and the Accumulators 126, 128 and 130. The Manual Valve 76 develops supply pressures for Reverse (REV) and the various forward ranges (DR, D32) in response to driver positioning of the transmission range selector 77. The REV, DR and D32 pressures, in turn, are supplied via lines 72, 132 and 134 to the various Shift Valves 120–124 for application to the fluid operated pistons P1–P5, POC and PCR. The shift Valves 120, 122 and 124 are each spring biased against controlled bias pressures, the controlled bias pressures being developed by the solenoid operated valves A, C and B. The accumulators 126, 128 and 130 are used to cushion the apply, and in some cases the release, of clutches C5, C2 and C3, respectively.

Figure 3:
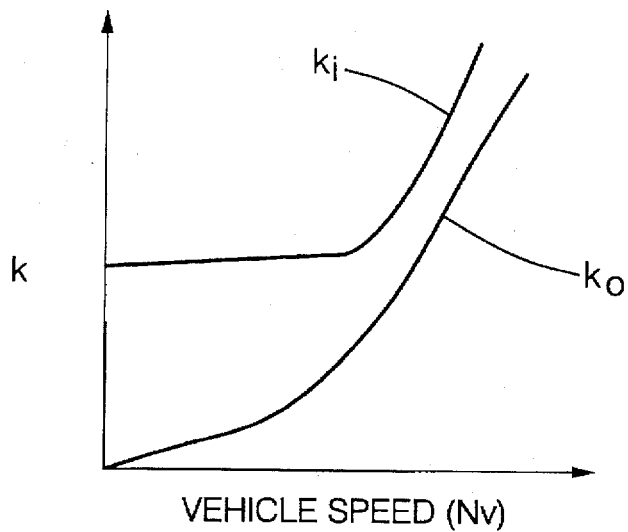
FIG. 3 graphically illustrates input and output capacity factors, ki and ko respectively, of a torque converter; and, FIGS. 4–6 illustrate flow diagrams representing a series of program instructions as executed by the control unit of FIGS. 1a in carrying out the present invention.

A chart of the ON/OFF states of valves A, C and B for establishing the various transmission speed ratios is given in FIG. 3. In Neutral and Park, the solenoids A, B and C are all off. In this condition, line pressure is supplied to clutch piston POC through orifice 176, but the remaining clutches are all disengaged. Reverse fluid pressure, when generated by Manual Valve 76 in response to driver displacement of range selector 77, is supplied directly to clutch piston P3 via lines 72, 73 and 140, and to clutch piston PCR via lines 72, 142, orifice 144 and Shift Valve 124.

A garage shift to the forward (Drive) ranges is effected when Manual Valve 76 is moved to the D position, connecting line pressure to the DR pressure supply line 132. The DR pressure is supplied to the clutch piston P1 via line 146 and orifice 148 to progressively engage clutch C1. At the same time, Solenoid Operated Valves A and C are energized to actuate Shift Valves 120 and 122. The Shift Valve 122 directs DR pressure in line 132 to clutch piston P4 via Regulator Valve 150 and line 152. The Shift Valve 120 supplies a bias pressure to the Regulator Valve 150 via line 154 to boost the C4 pressure. In this way, clutches C1, C4 and OC are engaged to establish 1st speed ratio.

Referring to the chart of FIG. 1d, a 1-2 upshift is effected by deenergizing Solenoid Operated Valve A to return Shift Valve 120 to its default state. This routes DR pressure in line 132 to the clutch piston P2 via Shift Valve 120, lines 156, 158 and 162, and orifice 160 to engage the clutch C2. Line 162 is also connected as an input to accumulator 128, the backside of which is maintained at a regulated pressure developed by valve 164. The engagement of clutch C2 is thereby cushioned as the C2 apply pressure, resisted by spring force, strokes the piston of accumulator 128. Of course, a 2-1 downshift is effected by energizing the Solenoid Operated Valve A.

Referring again to the charge of FIG. 1d, a 2-3 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. Line 170 is connected via line 172 as an input to accumulator 126, the backside of which is maintained at a regulated pressure developed by vale 164. The engagement of clutch C5 is thereby cushioned as the C5 apply pressure, resisted by spring force, strokes the piston of accumulator 126. Of course, a 3-2 downshift is effected by deenergizing the Solenoid Operated Valve B.

Referring again to the chart of FIG. 1d, a 3-4 upshift is effected by deenergizing Solenoid Operated Valves B and C to return Shift Valves 124 and 122 to their default positions, as depicted in FIGS. 1a–1b. The Shift Valve 124 thereby (1) exhausts clutch piston P5 and accumulator 126 via line 170 and orifice 174 to release clutch C5, and (2) supplies pressure to clutch piston POC via lines 66 and 171 and orifice 176 to engage clutch OC. The Shift Valve 122 (1) exhausts clutch piston P4 via line 152 and orifice 178 to release clutch C4, and (2) supplies DR pressure in line 132 to clutch piston P3 via Shift Valve 120, orifice 180 and lines 182, 184, 73 and 140 to engage clutch C3. Line 182 is connected via line 186 as an input to accumulator 130, the backside of which is maintained at a regulated pressure developed by valve 164. The engagement of clutch C3 is thereby cushioned as the C3 apply pressure, resisted by spring force, strokes the piston of accumulator 130. Of course, a 4-3 downshift is effected by energizing the Solenoid Operated Valves B and C.

Referring again to the chart of FIG. 1d, a 4-5 upshift is effected by energizing Solenoid Operated Valve B to actuate the Shift Valve 124. This exhausts the clutch piston POC via orifice 166 to release the clutch OC, and supplies line pressure in line 66 to clutch piston P5 via orifice 168 and line 170 to progressively engage clutch P5. As indicated below, line 170 is also connected via line 172 as an input to accumulator 126, which cushions the engagement of clutch C5 as the C5 apply pressure, resisted by spring force, strokes the piston of accumulator 126. Of course, a 5-4 downshift is effected by deenergizing the Solenoid Operated Valve B.

The Solenoid Operated Valves A, B and C, the TCC Bias Valve 108 and the Line Pressure Bias Valve 78 are all controlled by a computer-based Transmission Control Unit (TCU) 190 via lines 192–196. As indicated above, the valves A, B and C require simple on/off controls, while the valves 108 and 78 are pulse-width-modulated (PWM). The control is carried out in response to a number of input signals, including an engine throttle signal %T on line 197, a turbine speed signal Nt on line 198, an output speed signal No on line 199 and a transmission temperature signal Tt on line 204. The throttle signal is based on the position of engine throttle 16, as sensed by transducer T; the turbine speed signal is based on the speed of turbine shaft 42, as sensed by sensor 200; the output speed signal is based on the speed of output shaft 20, as sensed by sensor 202, and the transmission temperature signal Tt is based on the temperature of the fluid in reservoir 64, as determined by the temperature sensor 206. In carrying out the control, TC0 190 executes a series of computer program instructions, represented by the flow diagrams of FIGS. 4–6 described below.

With reference first to FIG. 2, a graphical representation of vehicle speed (Nv) and throttle position (% T) relationships establishing a shift schedule for exemplary speed ratio changes is shown. Vehicle speed is the conventional and preferred embodiment of a powertrain output speed quantity and throttle position is the conventional preferred embodiment of engine load. The solid line represents exemplary upshift relationships from third gear to fourth gear while the broken trace represents exemplary downshift relationships from fourth gear to third gear. Conditions may be such that for a given throttle and speed relationship an upshift is normally scheduled such as represented by the point labeled Nup in the figure. Under normal conditions, the wheel torque in the upshifted gear is sufficient to maintain the vehicle speed without significant if any further throttle position adjustments. This is true also with respect to acceleration of the vehicle within the upshifted gear of course requiring more aggressive throttle changes. However, vehicle load conditions may be such that, for example, without throttle position change after such an upshift the vehicle loses speed and reaches the speed and throttle relationship point Ndn thereby causing a downshift wherafter the process of gaining speed to the upshift point may begin anew. This shift cycling back to the lower gear may also occur even more rapidly where the vehicle operator steps into the throttle after the upshift thereby reducing the speed differential between the present vehicle speed and the downshift vehicle speed associated with the new throttle position. Perhaps the most poignant example of this is realized from examination of the throttle position shown at point % Tdn in the figure representing an immediate and aggressive throttle application after an upshift which would then result in a substantially immediate downshift limited only by other limiting control functions in the shift control.

In accordance with the present invention, a vehicle speed and throttle position relationship such as point Nup is reached and an incipient upshift is indicated. Before the normal shift control allows for the upshift so indicated by satisfaction of the normal shift schedule, a measure of the wheel torque presently applied is determined. Then, using the already available downshift relationships between throttle position and vehicle speed, a predicted measure of wheel torque is derived which corresponds to the pre-shift vehicle speed and throttle position corresponding to the downshift point according to the shift schedule. Where it is determined that the predicted wheel torque is not at least as great as the current condition wheel torque, the upshift is inhibited. This technique advantageously and inherently accounts for changing vehicle loads as higher throttle positions tend to push the shift out in vehicle speed in accord with the shift pattern and likewise for the current performance requirements (i.e. acceleration) similarly due to throttle conditions established by the vehicle operator. The predicted wheel torque actually corresponds to the practical maximum wheel torque that the shift pattern will allow prior to a downshift in accord with the shift schedule. Therefore, for the present conditions, shift inhibition is readily and accurately performed in accordance with the already available shift schedule. Furthermore, there is no need for complex calculations of absolute values of torque and conditional compensation thereof. The present invention may readily use, and preferably does use, relative normalized torques, it only being necessary that the relative correspondence be maintained. Additionally, with other known data in conventional tabulated form, the added complexity of the torque multiplier effect of the torque converter in each of the respective speed ratios are preferably accounted for in the pre and post shift wheel torque values. Separate calibration tables are eliminated and the shift stabilization control of the present indention relies only upon the pre-existing shift schedule tables.

Figure 4:
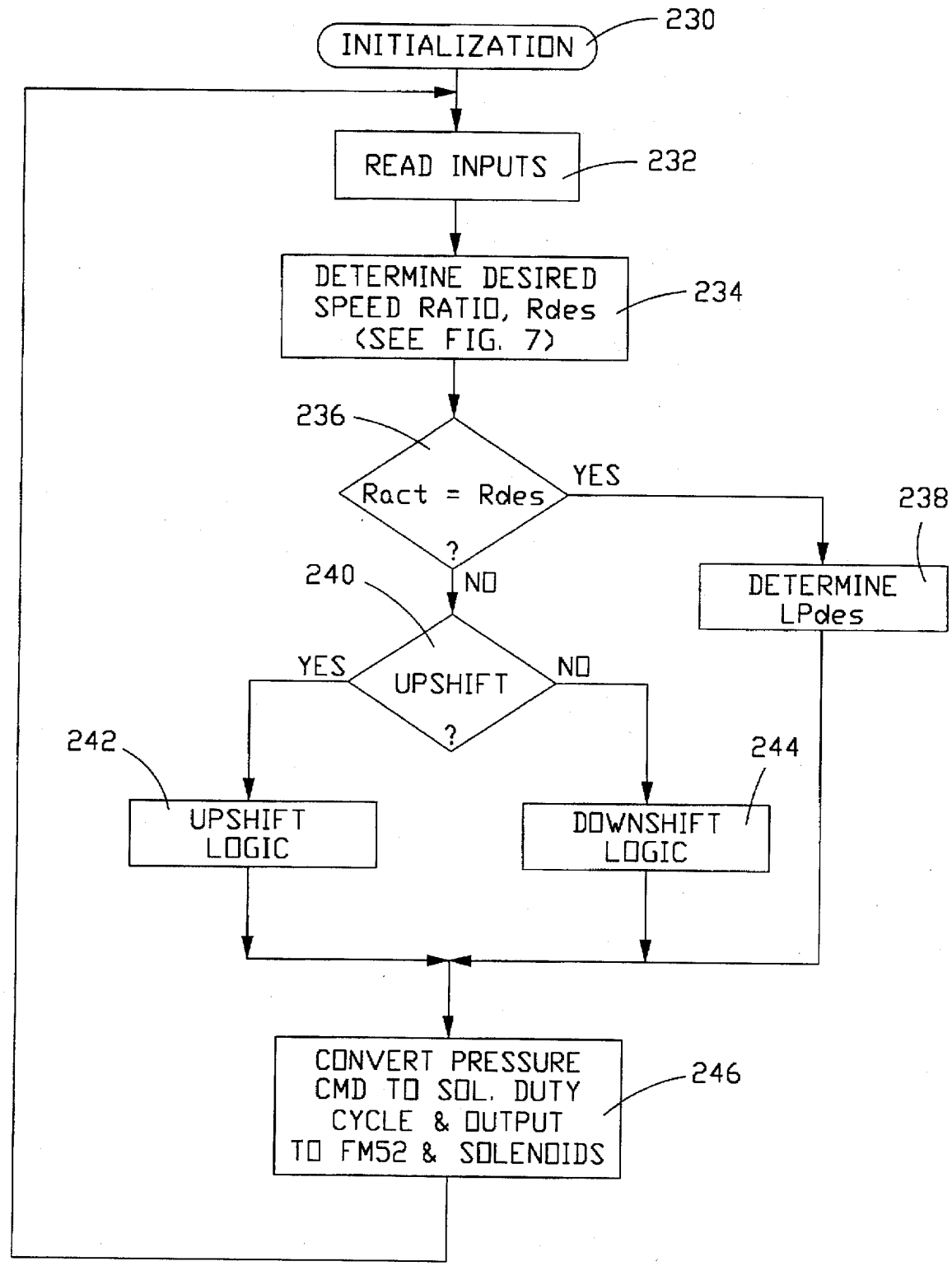
Figure 5:
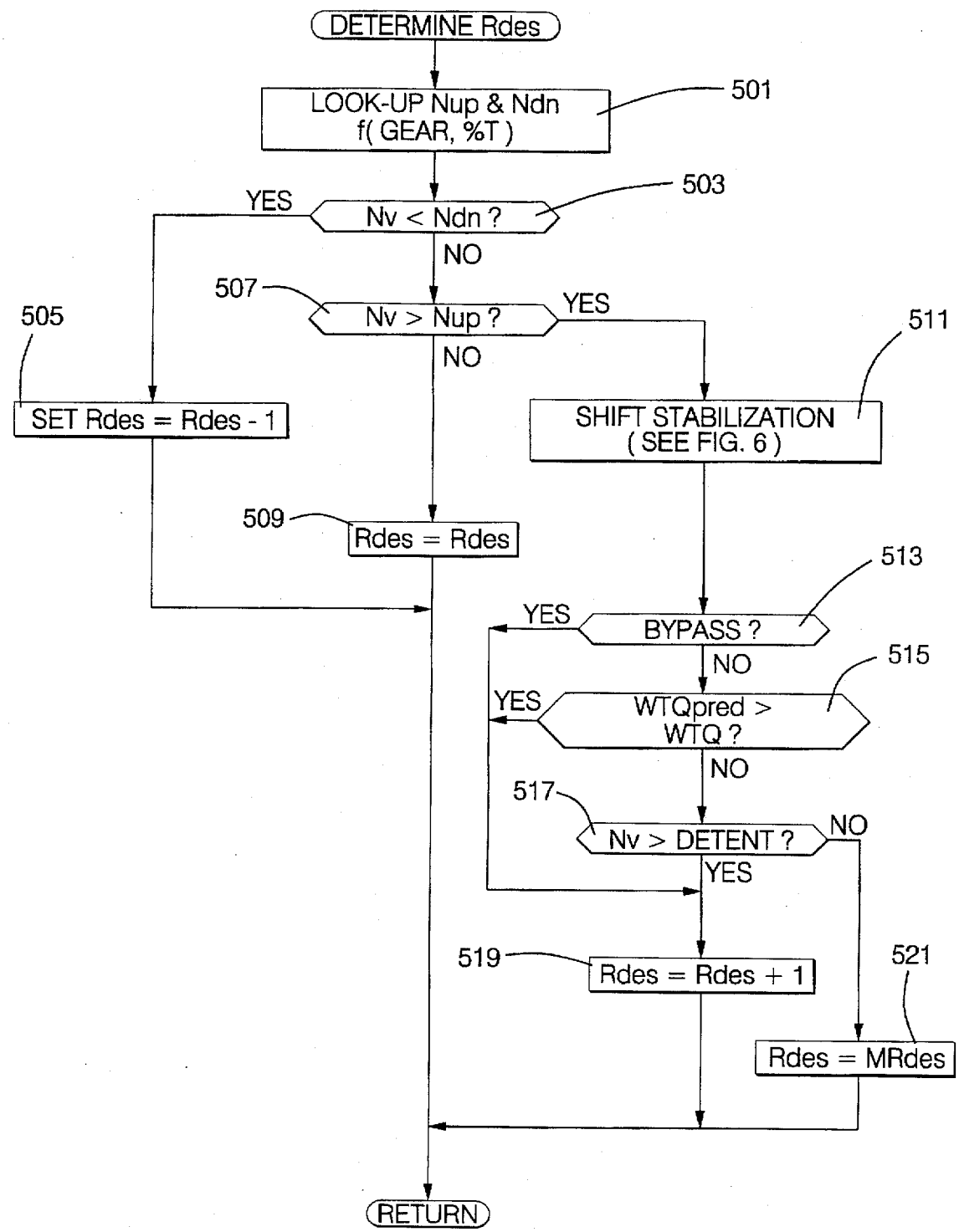
Figure 6:
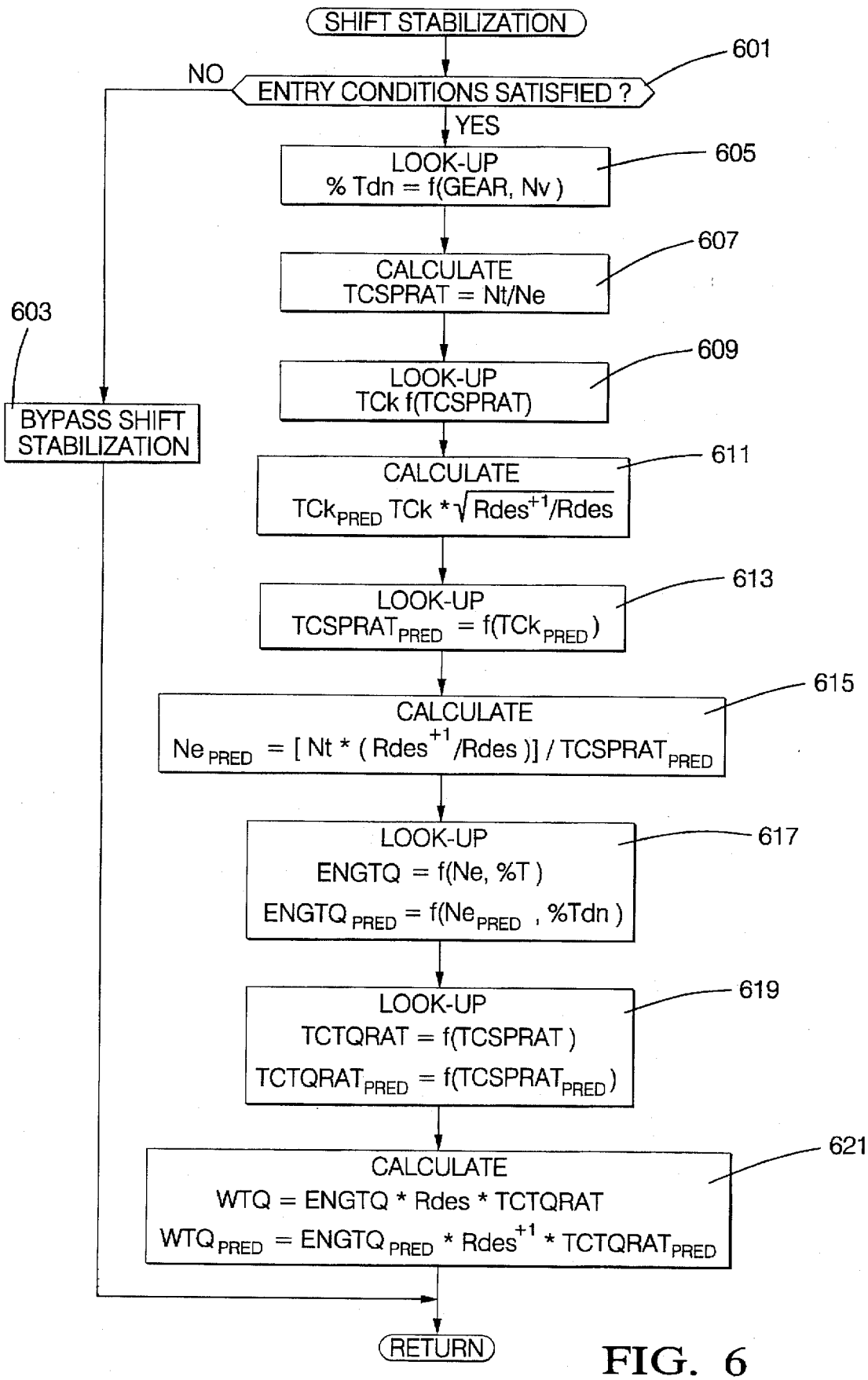

Referring to the FIG. 4–6, as series of program steps for execution by the transmission control unit of FIG. 1a for carrying out the control of the present invention are represented by the various flow charts. Taking first the flow chart of FIG. 4, a general continuously executed series of steps for shift control is illustrated. Upon powering up the vehicle, initialization functions are performed as indicated at step 230. Such functions include, for example, setting various timers and process variables to initial conditions. Thereafter, instructions represented by blocks 232–246 are repetitively executed. At block 232, a variety of inputs including those reference in FIG. 1a are read, filtered and otherwise conditioned for use in computations to follow. Conditioning of certain raw data, for example speed quantities, is performed here and related quantities such as actual speed ratio Ract and engine acceleration ACCEL are derived therefrom in accordance with well known techniques. Block 234 next represents a series of program instruction further detailed with respect to FIG. 5 in which the desired speed ratio Rdes is determined. If the actual speed ratio Ract is equivalent to the desired speed ratio Rdes then block 236 allows execution of block 238 whereat line pressure LPdes is determined for steady state operation. If Ract does not equal Rdes, then block 240 is executed to route the control to appropriate upshift or downshift logic blocks 242 and 244, respectively. Blocks 242 and 244 are used to determine the desired line pressure LPdes for carrying out the particular shift as well as timing of the required solenoid state change. In all cases, block 246 is executed to develop the solenoid duty cycle from the desired line pressure LPdes and to output the various duty cycles and discrete solenoid states to the solenoid operated valves described above in reference to FIGS. 1a and 1b.

Referring now to the DETERMINE Rdes routine of FIG. 5, block 501 references the shift schedule in table data form to return therefrom threshold values (Ndn and Nup) of vehicle speed for a downshift and an upshift from the present gear as a function of the present gear (GEAR) and throttle position (%T). Determination is made at step 503 by comparison of the current vehicle speed Nv to the downshift speed threshold whether a downshift is indicated by the present relationship between vehicle speed and throttle position. If the returned value for Ndn does not exceed the current vehicle speed, then a downshift condition is detected and block 505 is executed to establish the desired speed ratio Rdes as the adjacent speed ratio corresponding to the next lower gear $Rdes^{-1}$. If on the other hand the returned value Ndn exceeds Nv, a downshift condition is not currently detected relative the shift schedule and block 507 is allowed to execute. Block 507 performs a similar comparison of Nv with Nup to determine if an upshift condition is indicated by the present relationship between vehicle speed and throttle position. Where vehicle speed Nv exceeds the threshold Nup, an upshift condition is present and processing passes to the instructions associated with blocks 511–521. No such condition detected at block 507 eliminates any shift condition relative to the shift schedule and allows for the desired speed ratio to be maintained at the current value by way of block 509.

The first block encountered where an upshift condition detected is block 511 which represents a shift stabilization routine provided in further detail in FIG. 6. Block 513 performs a check on a bypass flag or similar indication of unacceptable conditions for implementation of the shift stabilization. If a bypass is indicated then normal control dictates that the shift be allowed to proceed as indicated at block 519. If, however, no bypass condition was indicated then continuation with block 515 takes place. As previously alluded to, the products of the shift stabilization routine for the purposes of describing the remainder of the flow chart of FIG. 5, are a predicted wheel torque ($WTQ_{PRED}$) and a current wheel torque (WTQ). The predicted wheel torque once again is a practical limit value directly corresponding to the shift schedule at present vehicle speed conditions, which limit if attempted to be exceeded will result in a downshift condition relative to the shift schedule. The current wheel torque is compared to the predicted wheel torque to determine the propriety of allowing an upshift to proceed in accord with the detected upshift condition. A predicted wheel torque in excess of the current wheel torque allows the shift to proceed since the post-shift torque conditions are in excess of the current gear torque conditions. Therefore, affirmation of the inquisition represented by block 515 allows block 519 to be executed to set the desired speed ratio to the speed ratio corresponding to the adjacent next higher gear $Rdes^{+1}$. On the other hand, insufficient wheel torque as established by a negative response at block 515 results in a general determination of the impropriety of allowing the upshift to proceed. However, it is desirable to perform a further inquiry at block 517 to make sure that a detent condition is not present which would otherwise take precedential effect over the shift stabilization to thereby prevent an engine overspeed condition. This is presented in the form of a detent speed threshold DETENT comparison with current vehicle speed Nv. Vehicle speed in excess of the detent threshold requires that the upshift proceed to ensure the engine speed remains below a predetermined limit and therefore execution of 519 is effectuated in response to an affirmative response and detent condition at block 517. Absence of a detent condition allows for the continuation in the present speed ratio or alternatively phrased an inhibition of the upshift otherwise indicated as being desirable according to the shift schedule.

With reference now to the SHIFT STABILIZATION routine of FIG. 6, a first general determination with respect to a variety of entry conditions is made at block 601. For example, if vehicle acceleration is determined to be greater than a predefined limit, it may not be desirable to implement the present control and such is noted by setting a bypass flag or taking similar steps at block 603. Entry conditions having been satisfied, blocks 605–621 are executed to provide for a preferred exemplary implementation of the present control.

Firstly, Block 605 reference shift schedule data as graphically illustrated in FIG. 2 to retrieve a throttle threshold limit as a function of the present vehicle speed and the next higher gear ($GEAR^{+1}$). This can be seen for example on the broken trace of FIG. 2 where 3rd gear is presently assumed engaged, 4th gear is the next higher gear ratio and the 4-3 shift line (broken trace) represents the shift schedule with respect to the predetermine 4th to 3rd downshift relationships between vehicle speed and throttle position. The speed ratio of the torque converter (TCSPRAT) is calculated as the ratio of the turbine speed Nt and the engine speed Ne at block 607. Steps 609–613 accomplish the determination of the predicted speed ratio of the torque converter ($TCSPRAT_{PRED}$) in the next higher gear. While the present invention may be implemented in a form which does not include such a calculation, through more crude estimation techniques of the upshifted torque converter speed ratio, it is preferred to perform the prediction steps embodied in blocks 609–613. Block 609 represents the referencing of a table of empirically determined data which correlates torque converter speed ratio TCSPRAT to the torque converter 'k factor' (TCk) which is a semi-dimensionless representation of a torque capacity of the fluidic coupling. Input and output k factors are available in table form and differ with repect to one another. Of interest in the present invention are the relationships of input k factors and torque converter speed ratios. A graphical representation of both input and output k factors ($k_i$ and $k_o$) is shown in FIG. 3. These relationships are generally well known to those skilled in the art and will not be further elaborated upon herein. The determination of TCk in the preferred speed ratio determination is allows for a relatively simple and accurate determination of the k factor in the next higher gear through a predetermined relationship between k factors associated with different speed ratios. The predicted k factor in the next higher gear is shown in block 611 to be equivalent to TCk multiplied by the square root of the ratio of the speed ratio of the next higher gear $Rdes^{+1}$ to the current gear speed ratio Rdes. Block 613 is then able to very accurately predict the torque converter speed ratio ($TCSPRAT_{PRED}$) in the upshift speed ratio once again by the predetermined relationships between the output k factor and speed ratios as graphically depicted in FIG. 3.

The real import of the $TCSPRAT_{PRED}$ determination is two-fold. First, as exemplified in block 615, an extremely accurate predicted post-shift engine speed $Ne_{PRED}$ can be established thereby removing the uncertainty that a more loosely determined torque converter operating point would inject into the calculations. Block 615 therefore can be seen to calculate $Ne_{PRED}$ for the assumed condition of a substantially constant vehicle speed across the upshift. Block 617 next reference table data embodying known relationships between engine torque, engine speed and throttle position. The current engine torque (ENGTQ) is established as a function of the current engine speed and throttle position whereas the predicted engine torque ($ENGTQ_{PRED}$) does so as a function of the predicted engine speed $Ne_{PRED}$ and the throttle position threshold earlier determined from the shift schedule. Therefore, $ENGTQ_{PRED}$ is substantially equivalent to the engine torque sustainable in the next higher gear at the predetermined vehicle speed before a downshift condition would be detected in relation to the shift schedule. Preferably, the engine torque values are provided from normalized calibration data which eliminates any necessity of adjustments for variables such as barometric pressure.

Block 619 performs a look-up of both the current torque ratio of the torque converter (TCTQRAT) and predicted torque ratio in the next higher gear ($TCTQRAT_{PRED}$) as a predetermined function of a respective torque converter speed ratio. In the case of the current torque ratio, TCSPRAT is the referencing value whereas $TCSPRAT_{PRED}$ is the referencing value for the predicted torque ratio. Respective current and predicted wheel torques are next calculated in accord with respective torque multiplication effects of the current and predicted gear speed ratios and torque converter speed ratios. The predicted wheel torque ($WTQ_{PRED}$) of course is thereby substantially equivalent to the wheel torque sustainable in the next higher gear at the predetermined vehicle speed before a downshift condition would be detected in relation to the shift schedule. Wheel torque as referred to herein is the preferred embodiment of a measure of powertrain output torque although it is generally understood that powertrain output torque as used herein may comprise other torque takeoff points at or after the output shaft of the transmission.

While the present invention has been described with respect to certain preferred embodiments, it is anticipated that various modifications and alternatives within the scope of the appended claims may be readily implemented by one skilled in the art.

We claim:

1. A method of preventing shift cycling between numerically adjacent speed ratios in a motor vehicle powertrain including an engine imparting torque through a torque converter to the input of an automatic transmission having a plurality of speed ratios selectively engaged in accordance with a shift schedule comprising predetermined relationships between throttle position and powertrain output speed, said automatic transmission operatively coupling an output torque to at least one drive wheel, the method comprising the steps:

monitoring powertrain output speed;

monitoring throttle position;

while a first one of said plurality of speed ratios is engaged, detecting an upshift condition with respect to the shift schedule normally effective to schedule upshifting to a second one of the plurality of said speed ratios;

providing a minimum post-shift output torque requirement;

providing a maximum post-shift output torque substantially equivalent to output torque sustainable at a predetermined powertrain output speed before a downshift condition would be detected assuming the second one of the plurality of speed ratios was engaged; and, inhibiting an upshift to the second one of the plurality of speed ratios regardless of said detected upshift condition when the maximum post-shift output torque is less than the minimum post-shift output torque requirement.

2. The method of preventing shift cycling between numerically adjacent speed ratios as claimed in claim 1 wherein the step of inhibiting an upshift overridded when the vehicle powertrain output speed exceeds a predetermined detent value.

3. The method of preventing shift cycling between numerically adjacent speed ratios as claimed in claim 1 wherein the post-shift output torque requirement is substantially equivalent to output torque existing substantially concurrently with the detected upshift condition.

4. The method of preventing shift cycling between numerically adjacent speed ratios as claimed in claim 1 wherein the predetermined powertrain output speed is substantially equivalent to powertrain output speed existing substantially concurrently with the detected upshift condition.

5. The method of preventing shift cycling between numerically adjacent speed ratios as claimed in claim 1 wherein the step of providing a minimum post-shift output torque requirement comprises the steps:

providing a measure of engine torque existing substantially concurrently with the detected upshift condition;

providing a torque multiplication factor of the torque converter existing substantially concurrently with the detected upshift condition; and calculating the minimum post-shift output torque requirement as a predetermined function of the measure of engine torque, the torque multiplication factor, and the first one of said plurality of speed ratios.

6. The method of preventing shift cycling between numerically adjacent speed ratios as claimed in claim 5 wherein the step of providing the measure of engine torque comprises the steps:

determining engine speed and throttle position existing substantially concurrently with the detected upshift condition; and, providing from predetermined engine speed, throttle position and engine torque relationships the measure of engine torque corresponding to the engine speed and throttle position.

7. The method of preventing shift cycling between numerically adjacent speed ratios as claimed in claim 6 wherein said measure engine torque is a normalized measure of engine torque.

8. The method of preventing shift cycling between numerically adjacent speed ratios as claimed in claim 5 wherein the step of providing the torque multiplication factor comprises the steps:

calculating a torque converter speed ratio across the torque converter existing substantially concurrently with the detected upshift condition;

providing from predetermined torque converter speed ratio and torque multiplication factor relationships the torque multiplication factor corresponding to the torque converter speed ratio.

9. The method of preventing shift cycling between numerically adjacent speed ratios as claimed in claim 1 wherein the step of providing the maximum post-shift output torque includes:

predicting a maximum post-shift engine torque substantially equivalent to engine torque sustainable at the predetermined powertrain output speed before a downshift condition would be detected assuming the second one of the plurality of speed ratios was engaged;

predicting a post-shift torque multiplication factor of the torque converter as if the second one of the plurality of speed ratios were engaged at the predetermined powertrain output speed; and, calculating the maximum post-shift output torque as a predetermined function of the maximum post-shift engine torque, the post-shift torque multiplication factor, and the second one of said plurality of speed ratios.

10. The method of preventing shift cycling between numerically adjacent speed ratios as claimed in claim 9 wherein the step of predicting the maximum post-shift engine torque comprises the steps:

predicting a post-shift engine speed as if the second one of the plurality of speed ratios were engaged at the predetermined powertrain output speed;

providing from the shift schedule a maximum throttle position sustainable at the predetermined powertrain output speed before a downshift condition would be detected assuming the second one of the plurality of speed ratios was engaged; and, providing from predetermined engine speed, throttle position and engine torque relationships the maximum post-shift engine torque corresponding to the post-shift engine speed and maximum post-shift throttle position.

11. The method of preventing shift cycling between numerically adjacent speed ratios as claimed in claim 10 wherein the maximum post-shift engine torque is a normalized maximum post-shift engine torque.

12. The method of preventing shift cycling between numerically adjacent speed ratios as claimed in claim 11 wherein the step of predicting the post-shift engine speed comprises the steps:

predicting a post-shift torque converter speed ratio across the torque converter as if the second one of the plurality of speed ratios were engaged at the predetermined powertrain output speed;

providing a pre-shift torque converter turbine speed existing substantially concurrently with the detected upshift condition;

calculating the post-shift engine speed as a predetermined function of the post-shift torque converter speed ratio, the pre-shift torque converter turbine speed, the first one of said plurality of speed ratios, and the second one of said plurality of speed ratios.

13. The method of preventing shift cycling between numerically adjacent speed ratios as claimed in claim 10 wherein the step of predicting the post-shift torque multiplication factor comprises the steps:

predicting a post-shift torque converter speed ratio across the torque converter as if the second one of the plurality of speed ratios were engaged at the predetermined powertrain output speed;

providing from predetermined torque converter speed ratio and torque multiplication factor relationships the post-shift torque multiplication factor corresponding to the post-shift torque converter speed ratio.

14. The method of preventing shift cycling between numerically adjacent speed ratios as claimed in claim 13 wherein the step of predicting the post-shift torque converter speed ratio comprises the steps:

calculating a pre-shift torque converter speed ratio across the torque converter existing substantially concurrently with the detected upshift condition;

providing from predetermined torque converter input capacity and torque converter speed ratio relationships a pre-shift torque converter input capacity corresponding to the pre-shift torque converter speed ratio;

calculating a post-shift torque converter input capacity as a predetermined function of the pre-shift torque converter input capacity, the first one of said plurality of speed ratios, and the second one of said plurality of speed ratios;

providing from the predetermined torque converter input capacity and torque converter speed ratio relationships the post-shift torque converter speed ratio corresponding to the post-shift torque converter input capacity.

15. A method of preventing shift cycling between numerically adjacent speed ratios in a motor vehicle powertrain including an engine imparting torque through a torque converter to the input of an automatic transmission having a plurality of speed ratios selectively engaged in accordance with a shift schedule comprising predetermined relationships between throttle position and powertrain output speed, said automatic transmission operatively coupling an output torque to at least one drive wheel, the method comprising the steps:

monitoring powertrain output speed;
monitoring throttle position;
while a first one of said plurality of speed ratios is engaged, detecting an upshift condition with respect to the shift schedule normally effective to schedule upshifting to a second one of the plurality of said speed ratios;

providing a measure of engine torque existing substantially concurrently with the detected upshift condition;

providing a torque multiplication factor of the torque converter existing substantially concurrently with the detected upshift condition;

calculating a minimum post-shift output torque requirement as a predetermined function of the measure of engine torque, the torque multiplication factor, and the first one of said plurality of speed ratios;

predicting a maximum post-shift engine torque substantially equivalent to engine torque sustainable at the predetermined powertrain output speed before a downshift condition would be detected assuming the second one of the plurality of speed ratios was engaged;

predicting a post-shift torque multiplication factor of the torque converter as if the second one of the plurality of speed ratios were engaged at the predetermined powertrain output speed;

calculating a maximum post-shift output torque as a predetermined function of the maximum post-shift engine torque, the post-shift torque multiplication factor, and the second one of said plurality of speed ratios; and, inhibiting an upshift to the second one of the plurality of speed ratios regardless of said detected upshift condition when the maximum post-shift output torque is less than the minimum post-shift output torque requirement.

16. The method of preventing shift cycling between numerically adjacent speed ratios as claimed in claim 15 wherein the step of predicting the maximum post-shift engine torque comprises the steps:

predicting a post-shift engine speed as if the second one of the plurality of speed ratios were engaged at the predetermined powertrain output speed;

providing from the shift schedule a maximum throttle position sustainable at the predetermined powertrain output speed before a downshift condition would be detected assuming the second one of the plurality of speed ratios was engaged; and, providing from predetermined engine speed, throttle position and engine torque relationships the maximum post-shift engine torque corresponding to the post-shift engine speed and maximum post-shift throttle position.

17. An apparatus for preventing shift cycling between numerically adjacent speed ratios in a motor vehicle powertrain including an engine imparting torque through a torque converter to the input of an automatic transmission having a plurality of speed ratios selectively engaged in accordance with a shift schedule comprising predetermined relationships between throttle position and powertrain output speed, said automatic transmission operatively coupling an output torque to at least one drive wheel, the method comprising the steps:

means for monitoring powertrain output speed;
means for monitoring throttle position;
means for storing a predetermined shift schedule comprising predetermined relationships between the throttle position and powertrain output speed;
means determining a throttle position threshhold from said predetermined shift schedule which corresponds to a throttle position which if exceeded in an upshift gear higher than and adjacent to an engaged gear will cause an upshift to the upshift gear;
engine torque determining means for determining engine torque corresponding to combinations of throttle position and an engine speed;

powertrain output torque determining means for determining powertrain output torque corresponding to combinations of engine torque, speed ratios torque converter torque ratios;

means for comparing a first powertrain output torque determined by said powertrain output torque determining means in accord with a first throttle position monitored in the engaged gear and a powertrain output speed monitored in the engaged gear with a second powertrain output torque determined from a throttle position stored in said means for storing a predetermined shift schedule which corresponds to a powertrain output speed in the engaged gear;

means for inhibiting an upshift to the upshift gear if said first powertrain output torque exceeds said second powertrain output torque.

* * * * *